Aug. 1, 1972

R. L. LOWE 3,681,229

ALUMINA FEEDER

Filed July 17, 1970

INVENTOR.
RICHARD L. LOWE

By David W. Brownlee

Attorney

Aug. 1, 1972   R. L. LOWE   3,681,229
ALUMINA FEEDER
Filed July 17, 1970   3 Sheets-Sheet 2
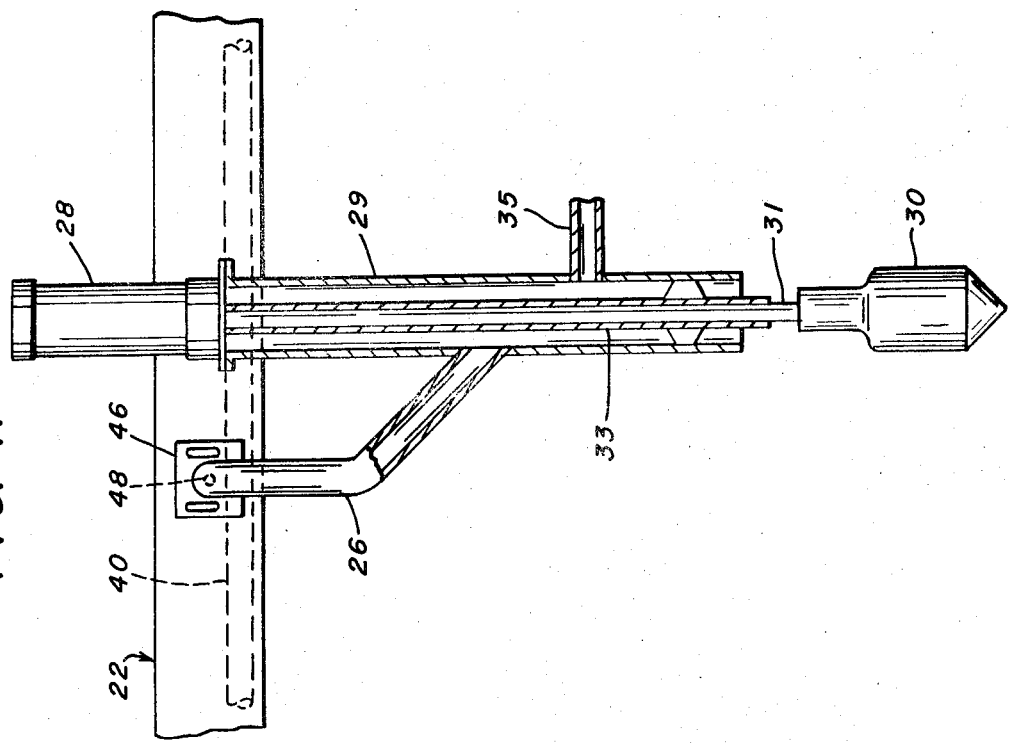
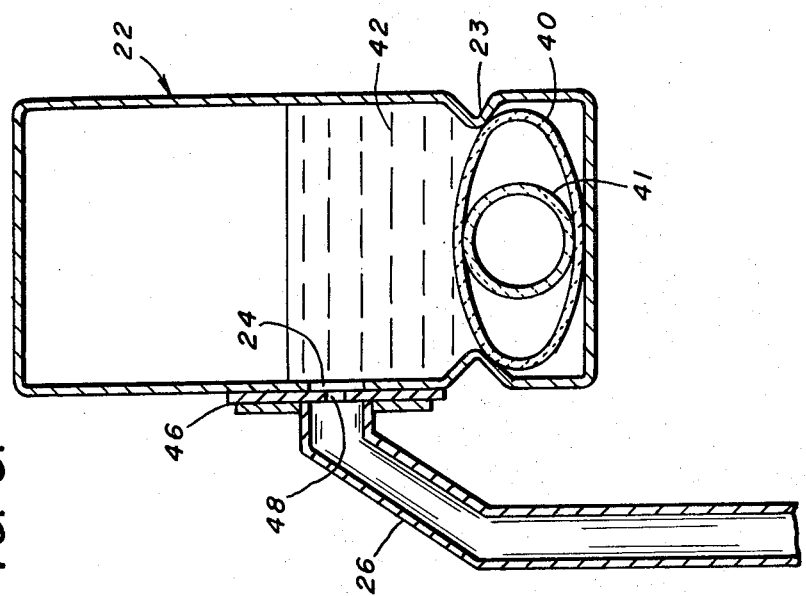
INVENTOR.
RICHARD L. LOWE
By David W. Brunker
Attorney INVENTOR.
RICHARD L. LOWE
By David W. Brownlee
Attorney 
United States Patent Office 3,681,229
Patented Aug. 1, 1972

3,681,229
ALUMINA FEEDER
Richard L. Lowe, Glenshaw, Pa., assignor to Aluminum Company of America, Pittsburgh, Pa.
Filed July 17, 1970, Ser. No. 55,773
Int. Cl. C22d 3/02, 3/12
U.S. Cl. 204—243 R    9 Claims

ABSTRACT OF THE DISCLOSURE

Apparatus for feeding alumina to an aluminum-producing electrolytic cell including a fluidization type conveyor communicating with a supply of alumina and having feed orifices in its side wall for feeding alumina into the electrolytic cell adjacent vertically reciprocal plungers which break the crust on the surface of the cell. The fluidization conveyor has a porous hose in it for introducing air into the alumina to fluidize the alumina so that it will flow through the conveyor. Metering apparatus with fluidizing valves therein is also provided between the alumina supply and the conveyor for supplying measured quantities of alumina into the conveyor for feeding the cell.

BACKGROUND OF THE INVENTION

As disclosed in Bruno et al. 3,400,062, it is well known to provide feed means and control means for supplying raw materials to an electrolytic cell for producing a molten metal as in the electrolytic production of aluminum. One of the problems encountered in the electrolytic aluminum production process is the control of the dissolved alumina concentration in the electrolyte or bath. If the alumina concentration is depleted or drops below a certain critical limit, or if there is an over concentration of alumina in the cell, the cell will not operate at peak efficiency and will result in what is known as anode effect for a depleted alumina concentration and as a "sick cell" for a too high alumina concentration. Further, it is desirable to disperse the alumina evenly throughout the cell in order to effect peak efficiency. Heretofore, it has been common to feed alumina into an electrolytic cell from a hopper and a measuring means positioned above the cell as shown in the Bruno et al. patent, and to provide a plunger adjacent the feed means for breaking the crust which forms on the surface of the cell. With the advent of larger cells, it has become desirable to feed the cells from a number of feed points and to provide an improved feeding system with improved feed control.

SUMMARY OF THE INVENTION

This invention provides ore feeding apparatus for a metal-producing electrolytic cell including means for metering a predetermined quantity of ore into a conveyor which moves the ore from the metering means to the electrolytic cell, and means for introducing the ore into the cell in approximately equal portions at a plurality of locations. A plurality of reciprocal plungers are also provided for breaking the crust which forms on the cell to permit the ore to drop into the molten bath in the cell. The metering means includes a meter container and fluidizing valves for regulating the flow of materials into the conveyor, and the conveyor includes means for fluidizing the particulate ore so that it will flow through the conveyor and out a plurality of feed orifices in a side wall of the conveyor.

Accordingly, an object of the invention is to provide an improved system for feeding raw materials into a metal-producing electrolytic cell.

Another object of the invention is to provide a fluidization type conveyor communicating with a metering means for feeding a predetermined quantity of particulate metal ore into a metal-producing electrolytic cell.

A further object of the invention is to provide improved metering apparatus.

A further object of the invention is to provide a drying means to remove moisture from the alumina prior to its introduction into the molten bath to thereby reduce emission of fluoride gas.

BRIEF DESCRIPTION OF THE DRAWINGS

The above and other objects and advantages of the invention will be more fully understood and appreciated with reference to the following description and drawings appended thereto wherein:

FIG. 3 is a cross-sectional view of the conveyor taken along line III—III of FIG. 1;

FIG. 4 is a cross-sectional view of a crust breaker taken along line IV—IV of FIG. 1;

DESCRIPTION OF THE PREFERRED EMBODIMENT

Figure 1:
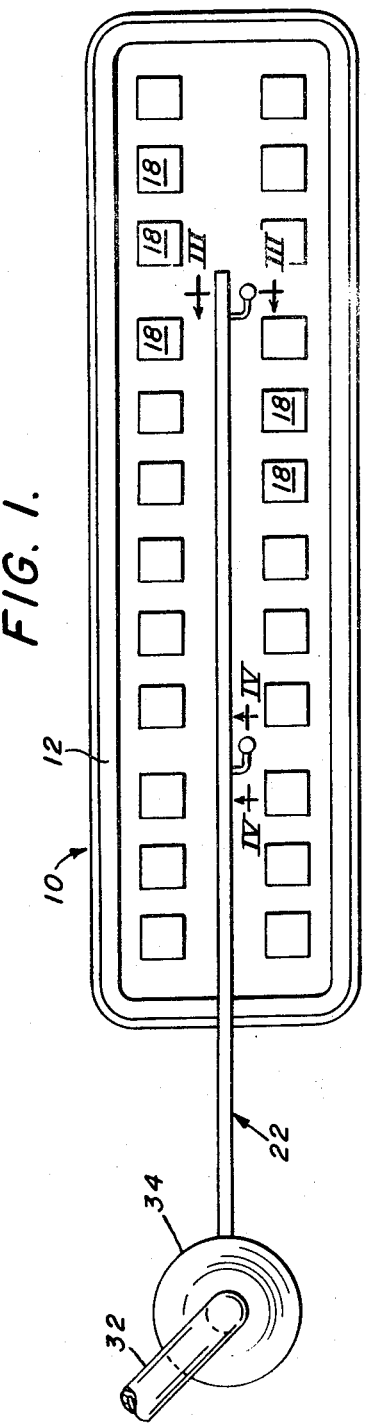
FIG. 1 is a plan view of an electrolytic cell including improved feeding apparatus therefor.
Figure 2:
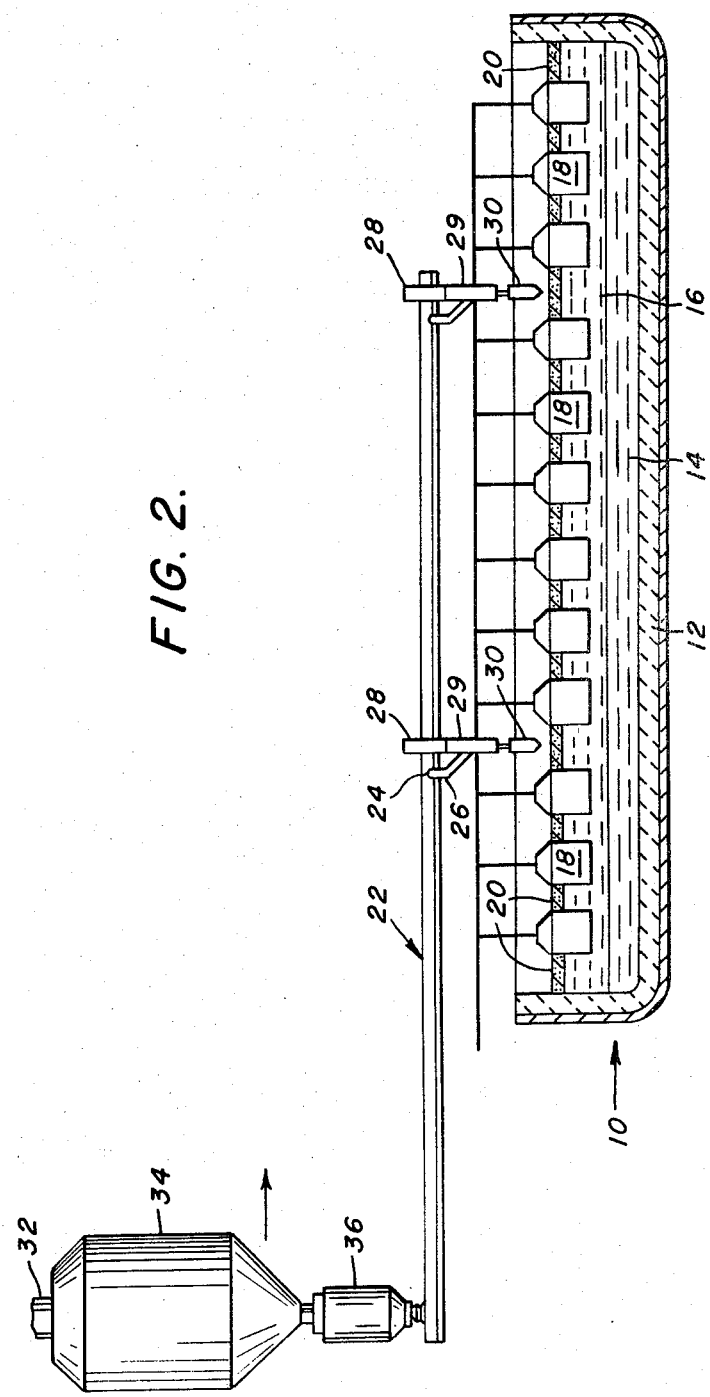
FIG. 2 is an elevational view in partial cross-section showing the electrolytic cell of FIG. 1.

Referring to the drawings, and particularly to FIGS. 1 and 2, numeral 10 denotes a conventional aluminum reduction cell or pot for producing molten aluminum. Such a cell 10 typically has a solid carbon cathode lining 12, a molten aluminum pool 14, and a molten electrolyte or bath 16 consisting essentially of dissolved aluminum oxide or alumina and cryolite, along with such additives as are customarily employed in the commercial Hall process. The cell further includes two rows of carbon anodes 18 which dip into bath 16, and which are periodically adjusted vertically to a proper working distance with respect to the top of the cathode 12 for efficient operation of the cell. Bus connections connect the anode and cathode to a power supply, not shown. Because of the electrical nature of the cell, it is electrically isolated from its grounded super structure or the building in which it is enclosed.

In the conventional electrolytic cell, electrolysis proceeds with current flowing through the electrolyte from the anode to the cathode, thereby decomposing the aluminum oxide into metallic aluminum with the evolution of gases at the anode which eventually escape from the cell. A pot cover and exhaust duct system, not shown, carry these gases safely away. In the operation of the cell, a crust 20 normally forms on the surface of bath 16 due to the exposure of the bath to the cooler ambient temperatures around the cell. To feed ore or other materials into the molten bath, the crust 20 must be broken to permit entry of such materials into the bath 16, and crust breakers such as reciprocal plungers 30 are usually provided for such purpose.

The feeding apparatus for such cells has typically been located directly over the cell, and has fed the alumina into the bath from one or more locations above the cell. The supply hopper of such typical feeding apparatus has usually been located over the cell and has been filled by means of buckets carried by a crane or the like. Such feed arrangements are not well suited for automatic controls, and add to the congestion in the air space over the cell which already includes the anodes, anode buses, hangers, pot covers, exhaust ducts, plungers, walkway gratings, etc. The present invention provides a system which is adapted for the use of automatic controls for feeding alumina into the cell at a plurality of locations. The system includes fluidization conveyor 22 which extends from an alumina supply adjacent the cell to a location over the surface of the cell, with the alumina supply comprising a supply duct 32, a reservoir or tank 34, and a metering apparatus 36 to control the feed of alumina into the conveyor 22. Since the reservoir and metering apparatus are located laterally adjacent to the cell rather than above the cell, they are easily accessible and do not interfere with the apparatus above the cell.

Referring to FIGS. 3 and 4, conveyor 22 is substantially rectangular in cross-section, although not limited to such cross-section, and preferably has two or more apertures 24 in its side wall, with adjustable orifice plates 46 over the apertures opening into ducts 26 which communicate with hollow housings 29 around plungers 30. Conveyor 22 has an air permeable hose 40 disposed therein along its length for fluidizing particulate alumina 42 in conveyor 22 so that the alumina will flow as a fluid along the conveyor. A rigid perforated tube liner 41 is preferably positioned in hose 40 in order to prevent its collapse, although such liner is not essential to the operation of the conveyor. Hose 40 has air or other gases pumped thereinto from a supply not shown, and the air escapes through pores in the hose into the alumina 42. Ridges 23 are provided in conveyor housing 22 to prevent the hose from floating upward due to buoyancy. Alternative fluidizing means such as an air-permeable false bottom may be provided in conveyor 22 as is well known in the art, although hose 40 is preferred for its simplicity. Preferably, conveyor 22 is level, but may be inclined downwardly toward cell 10. As fluidized, the alumina 42 will flow along the length of conveyor 22, much the same as water or other liquids, and will flow through orifices 48 in plates 46 on the side wall of the conveyor. Plates 46 are vertically adjustable for regulating the relative flow of alumina through the orifices 48 and into duct 26. By proper adjustment of the vertical height of each of the orifice plates 46 and the corresponding height of the orifices 48 therein, approximately the same quantity of alumina will flow through each of the orifices and into each of the ducts 26 at the two or more feed locations. Regulation of the alumina flow could alternatively be provided by means of a vertically adjustable weir or other means for adjusting the height or size of the orifices 48 in the side wall of conveyor 22.

Tube 26 feeds alumina into housing 29 around guide 33, plunger rod 31, and plunger 30 so that the alumina will drop into the cell immediately below the plunger. A fluid powered cylinder 28, preferably pneumatic, which is mounted separately from conveyor 22 by means not shown vertically reciprocates plunger 30 on signal. An additional inlet tube 35 may be provided on housing 29 for feeding other materials such as fluoride into the cell at the plunger locations.

Figure 5:
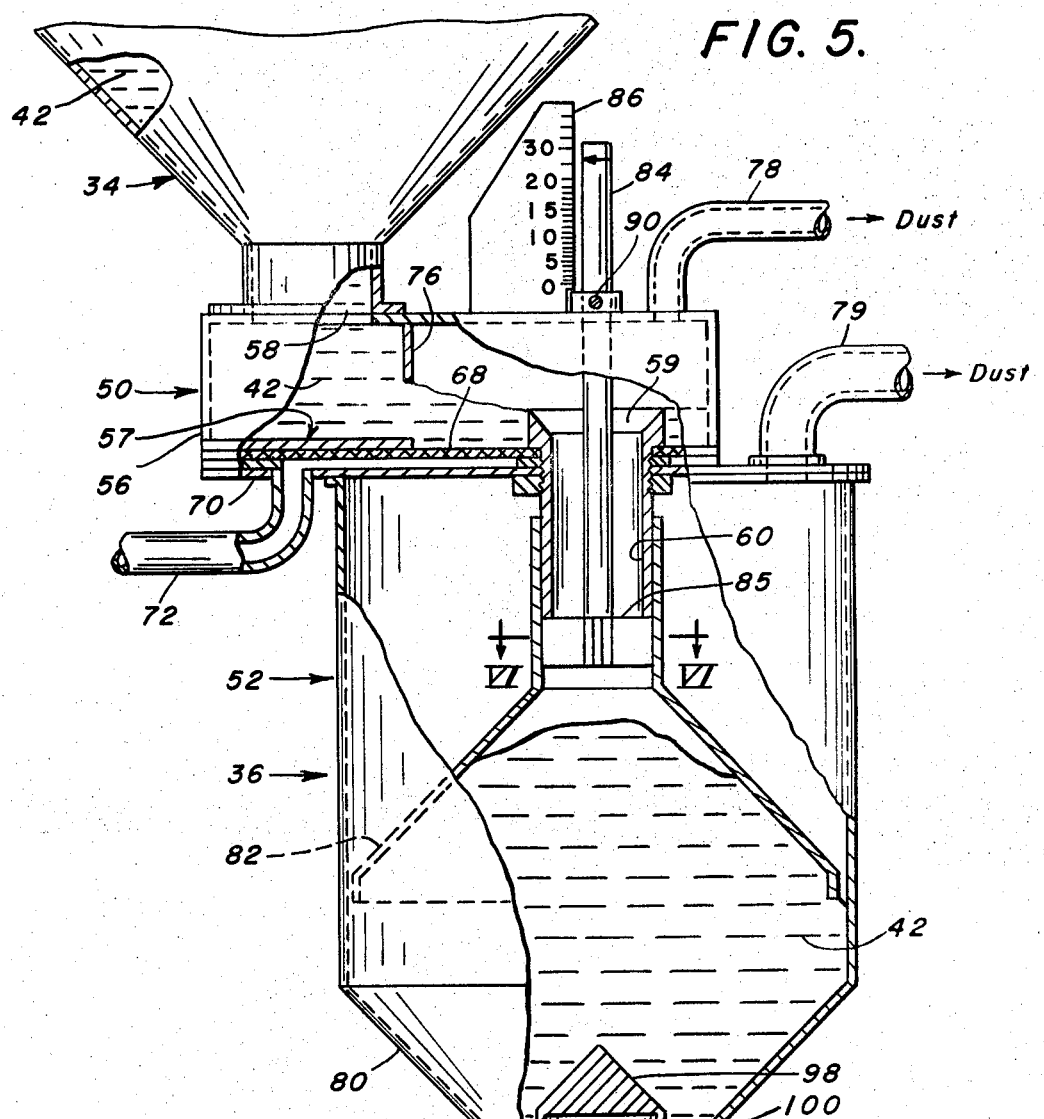
FIG. 5 is an elevational view in partial section illustrating the meter and valves of FIGS. 1 and 2.
Figure 6:
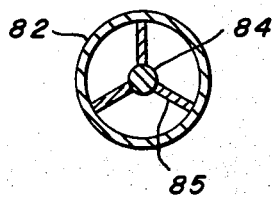
FIG. 6 is a cross-sectional view through the hood in the meter taken along line VI—VI of FIG. 5.

FIG. 5 illustrates metering apparatus 36 for supplying measured quantities of alumina 42 from reservoir or tank 34 into conveyor 22 to be fed into the cell. Metering apparatus 36 comprises an upper feed valve 50 for regulating the flow of alumina into meter container 52, and a lower drain valve 38 for draining alumina from the meter container 52 into conveyor 22. Feed valve 50 includes a box-shaped valve case 56 which has an inlet 58 from the tank 34 and a circular outlet 59 into meter container 52. A circular spout 60 is disposed in the case 56 and has a lower portion which extends downwardly into hopper 52, and an upper portion which extends into the valve case 56. The valve also includes a fluidizing bed, shown in detail in the cutaway portion of the figure, which comprises an air-permeable membrane 68 made of canvas, asbestos, cloth, metal gauze, metal felt, filter stone or the like, spaced above the impermeable air chamber 70 of the valve case 56. Cover plate 57 is placed above membrane 68 and extends to a point immediately below baffle 76 thus preventing fluidization of alumina 42 in this area. Means such as an air tube 72 communicating with an air supply, not shown, is employed to force air into the air chamber 70 so that it will escape through the membrane. Upper valve 50 also has a baffle plate 76 depending from the top of valve case 56, and disposed across the width of the valve adjacent the valve inlet 58. Upper vent 78, communicating with conveyor duct 22 by means not shown, vents dust and air from feed valve 50 into the conveyor.

Meter container 52 which receives alumina from the upper valve 50 has a converging lower section 80 leading into drain valve 38 and an inner hood 82 with a cylindrical upper end which is slidingly fitted over the lower portion of outlet spout 60 to adjust the volume of alumina dispensed. The height of hood 82 is adjusted by means of an adjustment rod 84 which is attached to hood 82 through spacers 85 and extends through the top of valve case 56. Set screw 90 holds rod 84 in place. A calibrated scale 86 is provided to indicate the volume adjustment of the inner hood 82. Lower vent 79 communicates with upper vent 78 and conveyor housing 22 to furnish displacement air to meter container 52 during discharge.

Drain valve 38 regulates the flow of alumina through the outlet end of hopper 52. This valve 38 comprises an air chamber 88 with a central aperture therethrough and an apertured air-permeable disc-shaped membrane 92 made of canvas, metal felt or the like, secured thereover by means of flange 94. A spout 96 having an upper end extending upwardly from the surface of membrane 92, and a lower end extending downwardly into conveyor 22 has a conical roof 98 secured thereover with an integral depending peripheral skirt 100 around the roof. Roof 98 is attached to the top of spout 96 by any suitable means such as set screws or the like which will not interfere with the flow of alumina under skirt 100 and over the upper end of tube 96. Conical roof 98 has a diameter substantially greater than the diameter of tube 96, and the peripheral skirt 100 around the roof extends into or below the plane of the upper edge of tube 96. Means such as tube 102 is provided for introducing air or other gases into the air chamber under the permeable membrane 92 so that the air will escape through membrane 92 to fluidize alumina on the membrane. When fluidized, the alumina will flow over the upper end of tube 96 and into conveyor duct 22 therebelow.

It is noted that the metering apparatus of the invention is especially designed to provide an almost exactly equal charge of alumina for each cycle. To produce this repeated accuracy of measurement of the alumina charges, all of the downwardly sloping surfaces in the meter are inclined downwardly from the horizontal by an angle of at least 35 degrees, and preferably 45 degrees. It is known that the natural angle of repose of alumina is approximately 35 degrees. Accordingly, by making the downwardly sloping walls of hood 82 on a 45 degree angle from the horizontal, assurance is had that the alumina will always completely fill the hood rather than leaving a void thereunder. The provision of a 45 degree angle on the top surfaces of spouts 60 and 96 and on the lower section 80 of the hopper also ensures that alumina will not collect on these surfaces. By ensuring that alumina will completely fill the hopper for every cycle and ensuring that alumina will not collect on the downwardly sloping surfaces in the meter, repeated accuracy of metering is achieved.

In the operation of the feeding apparatus of the present invention, the calibrated scale 86 and the adjustment rod 84 will be employed to preset hood 82 at a desired volume that the pot is to receive. Reservoir 34 will supply a head of alumina to upper feed valve 50 of the metering apparatus 36 for feeding the cell. To fill hopper 52 in preparation for feeding an alumina cell, automatic controls, not shown, open an air valve to air tube 72 so that air escapes through air permeable membrane 68 to fluidize the alumina 42 thereon and cause it to flow over the uper edge of tube 60 and into measuring hopper 52 to fill the hopper to the top of the tube 60. The level of alumina rises in the chamber until the fluid pressure from the fluidized portion of the feed valve chamber equals the fluid pressure from the unfluidized portion of the chamber. The height at which such equalization occurs depends to some extent on the location of the edge of the cover plate 57 under baffle plate 76. With the edge of cover plate 57 almost directly beneath baffle plate 76 as illustrated, the level of alumina in the fluidized portion will rise to a point equal to or slightly higher than the bottom edge of the baffle plate 76. Although fluidization continues, the level is limited to this point and fluidization air and dust are vented through upper vent 78. Fluidization supply air is continued for a period of time in excess of that required to actually fill the meter container in order to guarantee filling the meter. For example, experience has shown that the meter will fill in 20 seconds but the fluidizing air is left on for an additional 10 seconds or 30 seconds total. Metering apparatus 36 is now ready, upon signal, to supply its predetermined measured quantity of alumina to conveyor 22.

Conveyor 22 serves as a fluid bed in which a virtually constant depth or "head" of alumina is maintained. Actually, during the feeding operation, the depth of alumina is maximum at the feed end (5 inches) and diminishes slightly in the direction of flow analogous to the hydraulic gradient observed in water flowing in a trough. This gradient necessitates the individual adjustment of orifices to obtain a uniform "head" above each orifice which in turn allows equal flow through the orifices. Conveyor 22 never empties although its overall level may fluctuate a fraction of an inch. Controlled metering of alumina into the pot is the result of inter-related action of meter 36, conveyor 22 and orifices 48.

When a sensing device such as that disclosed in Bruno et al. 3,400,062, or other signaling means, signals that the cell is to be fed, plungers 32 are simultaneously stroked down and up several times in succession to break the crust 20 on cell 10. The number of plunger strokes may be adjustable from one to five or more strokes. The multiple strokes of the plunger also force into the bath the alumina that had been deposited over the hole from the previous feeding operation. Between feeding operations the alumina rests over the hole and on top of the molten bath. The high temperature drives off the moisture in the alumina prior to its being introduced into the molten bath thus reducing the emission of fluoride gas.

Immediately after the final strokes of the plungers, the feed cycle begins by introducing air into drain valve 38 and conveyor 22 to fluidize alumina in the valve and conveyor. The duration of this feed cycle is arbitrary, for example, 60 seconds. During this entire time alumina is discharged equally through orifices 48, ducts 26 and housing 29, and is deposited in the hole in crust 20. Simultaneously, the entire contents of the meter 36 is being discharged into the conveyor 22 which serves to maintain the level of alumina in conveyor 22. Meter 36 is actually drained approximately 45 seconds from the start of the cycle leaving a margin of 15 seconds to ascertain complete drainage. At the end of the feed cycle, automatic controls shut off the air supply to valve 38 and conveyor 22. The controls then again actuate upper feed valve 50 by forcing air through membrane 68 to fill hopper 52 in preparation for the next feed cycle. After hopper 52 is filled and upper feed valve 50 is again shut off, the metering apparatus remains inactive until cell 10 is to be fed again.

It is noted that the fluidizing time for the valves 50, 38 and conveyor 22 are not critical. As explained above, operation of upper feed valve 50 after hopper 52 is full will not affect the quantity of alumina in hopper 52 due to the self limiting capability. As for drain valve 38, it is merely operated long enough to insure complete emptying of hopper 52. After the conveyor 22 has been filled initially and the system has been cycled sufficiently to come to equilibrium, it will thereafter always have a constant alumina head. After initial equilibrium is reached it is apparent that the total amount of alumina delivered to the pot over a 24 hour period is almost exactly the product of the average amount discharged by the meter per operation and the total number of operations during the 24 hour period. It is also apparent that the overall accuracy of feeding is dependent primarily upon the repeatability of the meter 36. It has been demonstrated experimentally that the meter 36 produces a random error of approximately ±½ pound per operation at a 40 pound setting. This random error over a 24 hour period of time results in a repeatability which is entirely acceptable for accurate smelting pot control. All other details such as orifice size, time elements, orifice elevations, conveyor length, conveyor size, etc., are arbitrary and should in no way effect total accuracy. An increase in the meter volume through adjustment rod 84 produces a slightly higher operating level of alumina in conveyor 22. This higher level or "head" in turn produces a corresponding increase in flow from each orifice. It is apparent that the system is self compensating and reaches a new state of equilibrium without effecting accuracy. A decrease in meter volume produces a similar condition except with a slightly reduced alumina level in conveyor 22.

It is therefore seen that the present invention provides feeding apparatus which supplies alumina to an electrolytic cell from a convenient supply location located distal the cell, and which introduces substantially equal portions of alumina into the electrolyte bath at a plurality of feed locations in the cell. The feeding apparatus is well suited to the employment of automatic controls and to continuous operation of the cell for extended periods of time.

While the invention has been described with particular reference to a preferred embodiment thereof, it will be obvious to those skilled in the art that many modifications of the invention are possible without departing from the scope of the claims appended hereto.

What is claimed is:

1. Feeding apparatus for a metal-producing electrolytic cell comprising:
   (a) a reservoir for storing metal ore laterally adjacent adjacent an electrolytic cell;
   (b) means for measuring metal ore from said reservoir;
   (c) a fluidizing conveyor for conveying the ore from the measuring means to the cell and having a plurality of feed orifices in its side wall for subdividing the ore and feeding it into the cell in a number of approximately equal portions at a number of feed locations; and
   (d) means for breaking the crust on the cell to introduce the ore into the cell through the crust.

2. Feeding apparatus as set forth in claim 1 which includes a fluidizing valve between said measuring means and said conveyor.

3. Feeding apparatus as set forth in claim 2 which includes means for introducing fluidizing air into the valve while introducing fluidizing air into the conveyor.

4. Alumina feeding apparatus for an aluminum-producing cell comprising:
   (a) a reservoir for storing metal or laterally adjacent an electrolytic cell;
   (b) an alumina meter adjacent the cell including a hopper for measuring a predetermined quantity of alumina, a valve at the entrance to said hopper for introducing alumina into the hopper to fill it, and a valve at the outlet of said hopper for draining the hopper after it has been filled, said valve at the entrance to said hopper comprising a case with an inlet and an outlet at its opposite ends, a baffle extending downwardly from the top of said case between said inlet and said outlet and a fluidizing bed in the bottom of said case contiguous said outlet and extending to said baffle; and (c) a conveyor from said meter to the feed locations including at least one feed orifice in the wall of the conveyor for feeding alumina into the cell.

5. Alumina feeding apparatus as set forth in claim 4 in which downwardly sloping surfaces are provided in the meter inclined downwardly at an angle of at least 35 degrees from the horizontal to ensure accurate measuring of alumina through the meter.

6. Feeding apparatus as set forth in claim 4 in which said conveyor is horizontal and has a plurality of feed orifices in its wall and means for adjusting the vertical location of each of said orifices.

7. Feeding apparatus as set forth in claim 4 in which said fluidizing means comprises an air-permeable hose disposed in the conveyor along its length communicating with a pressurized air source.

8. Feeding apparatus as set forth in claim 4 in which said valves in said meter comprise a horizontal wall having an opening therethrough, means for preventing unfluidized alumina from falling through said opening and means for fluidizing the alumina on said wall around the opening so that the alumina will flow through the opening.

9. Feeding apparatus as set forth in claim 8 which includes means for introducing fludizing air into the valve at the exit end of the hopper while introducing fludizing air into the conveyor.

References Cited

UNITED STATES PATENTS

| | | | |
|---|---|---|---|
| 3,372,106 | 3/1968 | Chambran | 204—245 |
| 3,551,308 | 12/1970 | Capitaine et al. | 204—246 X |
| 3,216,918 | 11/1965 | Duclaux | 204—245 |
| 3,371,026 | 2/1968 | Kiley et al. | 204—245 |

FOREIGN PATENTS

| | | | |
|---|---|---|---|
| 126,271 | 6/1959 | U.S.S.R. | 204—245 |

JOHN H. MACK, Primary Examiner

DONALD R. VALENTINE, Assistant Examiner

U.S. Cl. X.R.

204—245, 246